United States Patent
Ren et al.

(10) Patent No.: US 10,145,281 B2
(45) Date of Patent: Dec. 4, 2018

(54) SYNERGISTIC COMBINATIONS OF LOW TEMPERATURE NOX ADSORBERS

(71) Applicant: GM GLOBAL TECHNOLOGY OPERATIONS LLC, Detroit, MI (US)

(72) Inventors: Shouxian Ren, Rochester Hills, MI (US); Gongshin Qi, Troy, MI (US); Steven J. Schmieg, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 14/995,441

(22) Filed: Jan. 14, 2016

(65) Prior Publication Data

US 2016/0222852 A1 Aug. 4, 2016

Related U.S. Application Data

(60) Provisional application No. 62/109,130, filed on Jan. 29, 2015.

(51) Int. Cl.
*F01N 3/00* (2006.01)
*F01N 3/08* (2006.01)

(52) U.S. Cl.
CPC ......... *F01N 3/0871* (2013.01); *F01N 3/0842* (2013.01); *F01N 2370/04* (2013.01);
(Continued)

(58) Field of Classification Search
CPC ..... F01N 2900/1404; F01N 2900/1602; F01N 3/0842; F01N 3/0871; F01N 2370/04; Y02T 10/24
(Continued)

(56) References Cited

U.S. PATENT DOCUMENTS

| 5,727,385 A | * | 3/1998 | Hepburn ............ B01D 53/9418 423/213.7 |
| 8,105,559 B2 | | 1/2012 | Melville et al. |

(Continued)

FOREIGN PATENT DOCUMENTS

WO 2008047170 A1 4/2008

OTHER PUBLICATIONS

Hai-Ying Chen et al.; Cold Start Concept (CSCTM): A Novel Catalyst for Cold Start Emission Control; SAE International; 2013-01-0535; Published Apr. 8, 2013; Copyright 2013 SAE International; doi:10.4271/2013-01-0535; saefuel.saejournals.org.

*Primary Examiner* — Phutthiwat Wongwian
*Assistant Examiner* — Diem Tran
(74) *Attorney, Agent, or Firm* — Reising Ethington P.C.

(57) ABSTRACT

Nitrogen oxides (NOx), carbon monoxide (CO), and residual hydrocarbons are adsorbed and stored from a low temperature, cold-start, diesel engine (or lean-burn gasoline engine) exhaust stream by a combination of a silver-based ($Ag/Al_2O_3$) NOx adsorber material and a zeolite-platinum group metal (zeolite-PGM) adsorber material for low temperature temporary storage of the NOx. The combination of NOx adsorber materials is formed as separate washcoats on channel walls of an extruded flow-through monolithic support. The monolith is located near the exhaust manifold of the lean burn engine where the combination of NOx adsorber particles temporarily adsorb exhaust constituents, and commence oxidation of them, until the progressively warming exhaust stream removes the stored constituents and carries them through the exhaust pipe to downstream NOx reduction converters which have been heated to their operating temperatures and complete the conversion of the NOx constituents to nitrogen and water for discharge from the vehicle's exhaust system.

17 Claims, 3 Drawing Sheets

(52) U.S. Cl.
CPC .............. *F01N 2900/1404* (2013.01); *F01N 2900/1602* (2013.01); *Y02T 10/24* (2013.01)

(58) Field of Classification Search
USPC .......................................................... 60/297
See application file for complete search history.

(56) References Cited

U.S. PATENT DOCUMENTS

| | | |
|---|---|---|
| 8,906,331 B2 | 12/2014 | Koch et al. |
| 8,920,756 B2 | 12/2014 | Koch et al. |
| 2011/0011068 A1* | 1/2011 | Ren ................... F01N 13/0097 60/297 |
| 2012/0308439 A1 | 12/2012 | Chen et al. |

* cited by examiner

SYNERGISTIC COMBINATIONS OF LOW TEMPERATURE NOX ADSORBERS

This application claims priority based on provisional application 62/109,130, titled "Synergistic Combinations of Low Temperature NOx Adsorbers," filed Jan. 29, 2015, and which is incorporated herein by reference.

TECHNICAL FIELD

This disclosure pertains to the use of a combination of adsorbents to better adsorb NO and $NO_2$ (collectively NOx) from the relatively low temperature exhaust gas stream (from an ambient temperature up to about 250° C.) flowing from a vehicle's diesel or lean-burn gasoline engine following a cold start of the lean burn engine. A silver-based NOx adsorber is combined with a zeolite/platinum group metal (PGM) NOx adsorber for temporary storage of the NOx gases until the temperature of the exhaust is high enough to release the stored NOx constituents and carry them to downstream catalyst systems which convert them to nitrogen and water before the exhaust stream leaves the vehicle exhaust system.

BACKGROUND OF THE INVENTION

Over the past several decades automotive vehicle manufacturers have satisfied continually-decreasing limits on the amounts of carbon monoxide, unburned hydrocarbons, and nitrogen oxides (largely NO, with smaller amounts of $NO_2$, collectively, NOx) that are discharged to the atmosphere in the exhaust from vehicle engines. These requirements of reduced exhaust emissions are combined with requirements for increased fuel economy. These combined requirements have required ever more sophisticated engines, computer control of engines, and exhaust gas aftertreatment systems, including catalytic converters for oxidation and reduction reactions, in the exhaust stream.

Present exhaust aftertreatment systems are quite effective in treating the exhaust from a warmed-up engine because the catalyst materials have been heated to temperatures (e.g., 200-250° C. and above) at which they serve to effectively oxidize carbon monoxide and residual hydrocarbons to carbon dioxide and water, and to reduce nitrogen oxides to nitrogen. These aftertreatment systems have been quite effective for both gasoline-fueled engines operating at a stoichiometric air-to-fuel mass ratio (about 14.7:1) and diesel engines (and other lean-burn engines) which operate with considerable excess air (e.g., air to fuel mass ratio up to about 25:1). However, it has been difficult to treat exhaust emissions immediately following a cold engine start, before the exhaust has heated a catalytic converter to its effective operating temperatures for the catalytic reactions. It is realized that such untreated emissions will make-up a significant portion of the total emissions at the tailpipe in the mandated testing of engine emissions control systems. The problem is particularly difficult with the treatment of mixed nitrogen oxides (NOx) in the exhaust of diesel engines. There is, therefore, a need for better systems for treating the exhaust gas from an engine following a cold start. The need is particularly acute in lean-burn engines, such as diesel engines, which tend to produce cooler exhaust streams because of the excess air used in the combustion mixtures charged to their cylinders.

SUMMARY OF THE INVENTION

This invention provides an effective combination of two different supported NOx adsorbers for temporary, low-temperature adsorption and temporary storage of nitrogen oxides (NOx) from the exhaust gas leaving a diesel engine (or a lean-burn gasoline engine) following a cold start of the vehicle. The combination of NOx adsorbers is preferably supported as washcoated particles on the channel walls of an extruded flow-through monolith support, located in the exhaust path from the engine, close to the exhaust manifold. The volume of supported NOx adsorption materials serves to store NOx constituents, residual hydrocarbons, and carbon monoxide from the exhaust stream, starting when its temperature is at 35° C. or lower. Depending on the original ambient temperature of the vehicle and its exhaust aftertreatment system, and the loading of the lean burn engine following a cold start, a period of a few hundred seconds may pass before the progressively warming exhaust gas desorbs or releases stored NOx constituents from the combination of low temperature NOx adsorbers and then carries the NOx to one or more downstream catalytic converters, which have now been warmed to their effective NOx reduction temperatures by the continued and warming exhaust flow. Additionally, while the adsorbed cold start exhaust emission constituents are retained on surfaces of the low temperature NOx adsorbers, some oxidation of each of NO, CO, and residual hydrocarbons is typically accomplished. Consequently, the harmful discharge of cold exhaust emission constituents is significantly reduced.

The first component of the low temperature NOx adsorber combination is a silver-based NOx adsorber material consisting of small particles of silver (or a silver oxide) deposited and dispersed onto a supportive material with high surface area, such as alumina ($Ag/Al_2O_3$). Methods for the preparation and individual use of this NOx adsorber are described in U.S. Pat. No. 8,920,756, titled "Silver Promoted Close Coupled NOx Absorber," issued Dec. 30, 2014, and assigned to the assignee of this invention. The text and drawing figures of this patent are incorporated into this specification by reference.

The second component of the NOx adsorber combination is a PGM-based NOx adsorber which comprises (i) a zeolite and (ii) a supported platinum group metal (PGM). The zeolite constituent comprises a suitable natural or synthetic zeolite, infiltrated and/or coated with a suitable base metal (for example iron or copper). The platinum group metal constituent comprises one or more platinum group metals (for example Pt and Pd) deposited and dispersed onto one or more inorganic metal oxide carriers (for example, alumina oxide or ceria oxide). The metal-oxide supported platinum group metal may be mixed together with the prepared zeolite adsorbent catalyst. Methods of preparation and individual use of this PGM-based NOx adsorber are described in U.S. Patent Application Publication 2012/0308439 A1, titled "Cold Start Catalyst and its use in Exhaust Systems," and published Dec. 6, 2012, as well as U.S. Pat. No. 8,105,559, titled "Thermally Regenerable Nitric Oxide Adsorbent," issued Jan. 31, 2012.

Fine particles of the first and second components of the low temperature NOx adsorber materials are deposited as separate washcoats on flow-through channels of one or two ceramic or metal honeycomb-like monoliths (or the like). If the first and second components are placed on separate monoliths, the second monolith is placed immediately downstream of the first monolith in the flow path of the exhaust gas stream. The silver NOx adsorber component and the zeolite-PGM adsorber component are prepared separately, both in the form of fine particles that can be dispersed as a suitably mobile liquid slurry for application to the channel wall surfaces of an extruded ceramic or metal monolith. The many parallel channels extend from the inlet face to the outlet face of the flow-through catalyst support structure. For example, a typical monolith may have 400 channel openings per square inch of the inlet and outlet surfaces. Each adsorber component washcoat slurry is applied to the channel wall surfaces in one of the following ways.

In a first embodiment, the silver NOx adsorber washcoat is applied to the channel wall surfaces of a first monolith reactor, the upstream reactor with respect to the flow of the diesel exhaust stream. And the zeolite-PGM NOx adsorber washcoat is applied to the channel wall surfaces of a second monolith reactor, which is immediately downstream in the flow path of the cold start exhaust stream. The silver-based NOx adsorber component benefits from the presence of the hydrogen ($H_2$) content of the cold diesel exhaust (e.g., up to 500 ppm $H_2$) during a vehicle cold-start for achieving its NOx adsorption. Accordingly, it is preferred to have hydrogen present when the exhaust stream contacts the silver-based component.

In a second embodiment, the silver NOx adsorber particle washcoat is applied to the front half of the channel wall surfaces starting from the inlet end (upstream end) of the monolith body. And the zeolite-PGM adsorber washcoat material is applied from the outlet end (the downstream end) back to the middle (or further) of the same monolith body. Again, it is preferred to have the silver adsorber washcoat material upstream in the adsorber combination, close to the exhaust manifold of the diesel or gasoline lean burn engine to benefit from the hydrogen ($H_2$) content of the cold diesel exhaust.

In a third embodiment, the zeolite-PGM adsorber is applied as a first washcoat layer on the total area of the channel walls of the monolith and the silver NOx adsorber is applied as a second washcoat layer on top of the zeolite-PGM adsorption layer and co-extensive with it.

The proportions of the silver-based NOx adsorber washcoat material may be varied with respect to the zeolite-PGM based NOx adsorption washcoat material. Since the respective washcoat adsorber materials are applied to the many wall surfaces of the channels of one or more monoliths, it is necessary to adopt a method of characterizing the respective capacities of the washcoat layers to adsorb NOx constituents and other constituents of the cold-start exhaust. When the washcoat materials are applied to a single monolith, the respective proportions of the washcoat adsorbers are known from the respective amounts actually applied to the channels of the monolith. But if the washcoat adsorbers are applied to different monoliths with different shapes or numbers of channels it may be more difficult (apart from the respective applied weights of the washcoats) to assess the respective adsorption capabilities of the silver-based washcoat and the zeolite PGM based washcoat. One suitable method for assessing the proportions of the two components is to consider the outer, superficial volumes of the monolith structures on which washcoat layers of the two components are applied, assuming that the channels of the monoliths may present different areas of exposure of the washcoats to exhaust gas flow if the two components are applied to two different monoliths. For example, a washcoat of silver-based NOx absorber material may be applied to the wall surfaces of the channels of a first monolith having 400 channels/sq. in. of inlet face, and a wash coat of zeolite-PGM absorber material is applied to a second differently-shaped monolith structure. In general, it is preferred that the outer volume of the monolith carrying the silver-based adsorber material be in the range of 10% to 50% of the total volume of the monoliths carrying the two components. The outer volume of a monolith is considered to be its superficial volume defined by the outer surface of the flow-through monolith. Thus, where two monoliths are used, the upstream monolith carrying the silver-based component may be equal in volume, or smaller, than the monolith carrying the zeolite-PGM based component. And where both NOx absorber materials are washcoated onto different portions of the lengths of the channels of the same monolith, the length of the silver-based washcoat may be equal to or smaller than the lengths of the channel washcoated coatings of the zeolite-PGM based absorber component.

Following an engine cold start, and until the exhaust gas is heated to about 200° C., the relatively cold exhaust flows over the thus-combined components of the NOx adsorber wash coated monolith or monoliths. As the exhaust stream is being heated up by continued engine operation, often a period of 100-200 seconds or more, the combination of the NOx adsorber materials markedly improves the storage of nitrogen oxides, as well as provides for the storage and oxidation of both hydrocarbons and carbon monoxide. It is found that the stated combinations of the two specified NOx adsorption components performs surprisingly and significantly better than the individual components used alone in an exhaust flow stream.

Once the exhaust stream is heated to about 200° C. or so, the stored NOx constituents are released into the hotter exhaust stream and then reduced by a downstream catalytic converter, such as, for example, an ammonia-based selective catalytic reduction (SCR) converter at its optimal operating temperatures. A common operating temperature range for the downstream NOx reduction catalysts is typically in the range of about 200° C. to about 400° C. or higher.

Other aspects and advantages of the invention will be apparent from illustrations of embodiments of the invention.

The left vertical axis of the graph is the NOx concentration (ppm) leaving each NOx adsorber-coated monolith vs. time in minutes (horizontal axis). Each synthetic exhaust gas stream was heated from about 50° C. to about 500° C. (right vertical axis) over a period of about 18 minutes (horizontal axis). The progressively increasing inlet temperature (with the passage of time) of the Silver NOx adsorber washcoat is indicated by the solid line and that of the PGM (zeolite-PGM) NOx adsorber washcoat by the short dash line with reference to the right-side vertical axis. For purposes of careful evaluation, these adsorption tests were conducted more slowly (i.e., over a longer time period) than the time usually required for the warming of diesel type vehicle exhaust stream following a cold start of the vehicle's engine.

It is seen that the NOx adsorption of the zeolite-PGM adsorber is best at lower exhaust stream temperatures and that of the silver adsorber is best at higher temperatures relative to the adsorbed NOx that is being removed from the zeolite-PGM adsorber washcoat material.

Figure 3:
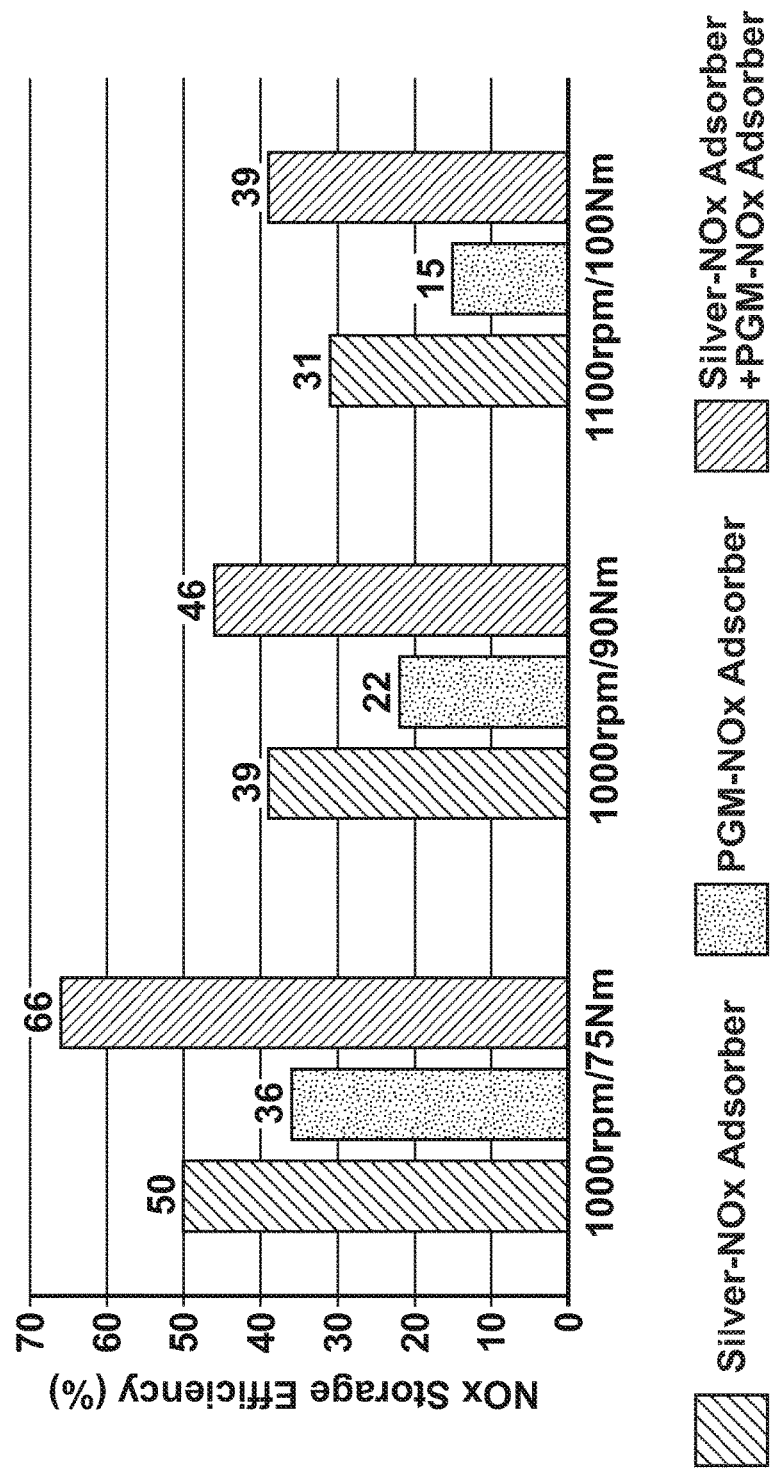

FIG. 3 is a comparison bar-graph of percent NOx storage efficiencies of an individual silver-based NOx adsorber (upward sloping lines in bar graph), an individual zeolite-PGM NOx adsorber (dotted bar graph), and a combination of the silver-based NOx adsorber and the zeolite-PGM based NOx adsorber (downward sloping lines in bar graph). When the adsorbers were combined the silver-based NOx adsorber was placed upstream of the zeolite PGM NOx adsorber.

Figure 4:
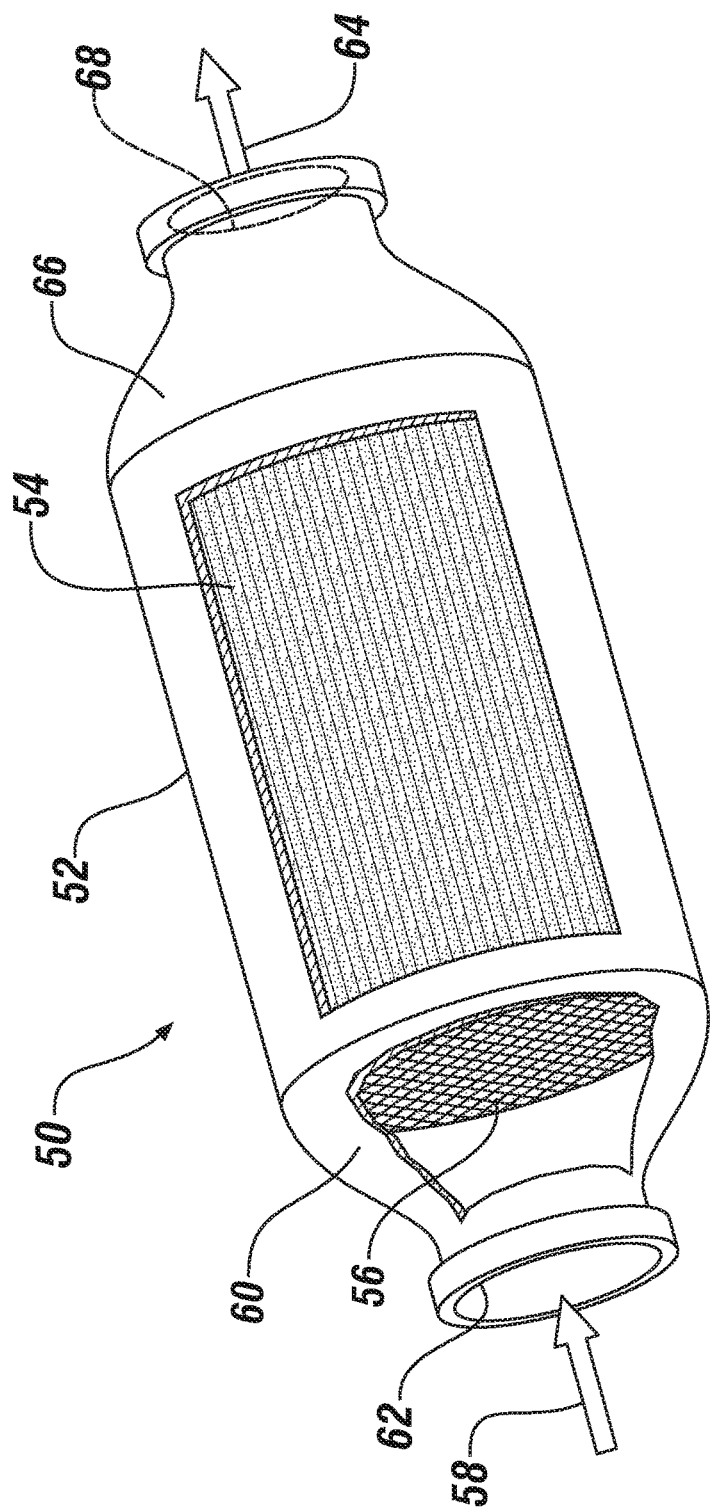

FIG. 4 presents an oblique side view of a cylindrical NOx adsorption device with stainless steel container enclosing an extruded cylindrical cordierite monolith with many parallel channels (e.g., 400 channels per square inch of monolith inlet/out let surfaces), each channel having square a cross-section and extending from a flat inlet face to a flat outlet face of the monolith. The four walls of each channel are coated with a dual-layer NOx adsorbent washcoats along their full lengths, first with a thin washcoat layer of a zeolite-PGM NOx adsorber particles, and on top of it, is another coextensive washcoat layer of a silver-based (Ag/$Al_2O_3$) NOx adsorber particles. The dual-layer NOx adsorption materials combination is one type of arrangement of their combination for use in accordance with this disclosure. In this illustration, the container and cordierite monolith are each formed as round cylinders, and a portion of the round container wall is broken away to reveal the cordierite monolith.

DESCRIPTION OF PREFERRED EMBODIMENTS

Exhaust emissions from a vehicle engine, operated on a dynamometer, are often evaluated by operating the engine in accordance with a specified testing procedure in which the engine may be subjected to a cold-start and thereafter accelerated and decelerated as prescribed. One such procedure is the U.S. Federal Test Procedure 75 Cycle. When a representative light-duty diesel engine is operated in accordance with the FTP 75 Cycle, it is found that more than 50% of the tailpipe emissions of nitrogen oxides (NOx) are emitted during the first couple of hundred seconds following a cold start. It is an object of this invention to provide a method of combining two different NOx adsorber catalysts synergistically for use in reducing NOx tailpipe emissions during such cold start engine operating periods.

During a warming-up operation following a cold start such diesel engines typically produce a gaseous exhaust with relatively high contents of nitrogen oxides ($NO_x$), hydrocarbons, carbon monoxide (CO), and up to 500 ppm hydrogen ($H_2$). In the case of diesel engines, the initial temperature of the exhaust gas is typically in the range of 25-50° C. from a cold engine. As the engine operates, the exhaust gas temperature in the exhaust system reaches 200° C. within a few minutes. The exhaust during the engine warm-up from a cold-start, depending, for example, on engine load, typically has a harmful emission composition, by volume, of about 100-200 ppm NOx, up to 4,000 ppm hydrocarbons and up to 0.3% CO. Also, up to 500 ppm hydrogen ($H_2$) is observed during the cold start period. Additionally, the diesel exhaust gas often contains a high concentration of soot or particulate matter (PM). It is desired to treat such exhaust gas compositions to minimize the discharge of any harmful emission components to the atmosphere other than nitrogen, carbon dioxide, and water. During the cold-start period of a light-duty diesel engine, representative values of the volumetric exhaust flow rate, with respect to the effective volume of the NOx adsorber monolith, typically range between 15,000-50,000 h$^{-1}$ (space velocity) depending on the size of the NOx adsorber monolith and its arrangement of flow-through channels.

The engine is typically operated under a computerized engine control system for management of timing and amount of fuel injection and air induction.

The combination of silver-based and zeolite-PGM based NOx adsorbing materials employed in practices of this invention are closely located to the outlet of exhaust manifold of the engine, to promote some oxidation of NO to $NO_2$, at exhaust temperatures in the range of 35° C. to about 200° C., and to temporarily store the majority of the mixture of NO and $NO_2$ until the exhaust gas heats the combined materials above their NOx storage temperature windows, and the downstream catalysts take over the NOx reduction function at their optimal operating temperature windows. It is necessary that the exhaust stream is first brought into contact with the combination of the NOx adsorber materials before it flows into contact with other exhaust treatment materials. Preferably the cold-start exhaust gas flows into contact first with the silver/alumina washcoat adsorber after flowing not more than about one meter distance along the flow path after leaving the exhaust manifold.

This invention provides methods of synergistically combining two significantly different types of NOx adsorbent materials. While each of the materials used in the combination is an effective adsorbent of nitrogen oxides (NOx) within its optimal operating temperature window, the combination of a suitable proportion of the individual adsorbents has been proved more effective.

A first NOx adsorbent material consists of very small (nanometer size) particles of silver (or a silver oxide) deposited on and supported by larger particles of high surface area alumina (Ag/$Al_2O_3$). This particulate material typically contains about one-half to about fifteen percent by weight of silver. The alumina-supported silver is prepared as a low viscosity aqueous slurry and deposited as a washcoat on, for example, the wall surfaces of an extruded cordierite monolith body having many parallel flow-through channels extending from an inlet face to an outlet face. The monolith is typically round or elliptical in cross-section and has, for example, 400 channels per square inch of inlet face surface area, each with a square or hexagonal opening. Since the total surface area of the wall surfaces of the many extruded channels is difficult to determine or measure, the weight of an applied washcoat component per unit of volume defined by the outer surface of the monolith structure is sometimes used as a comparative measure of its capacity for washcoated material applied to its integral flow-through channels. In general, a suitable quantity of the washcoat of the silver/alumina NOx absorber material is in the range of 50 to 200 grams of the silver alumina particles per liter of the outside volume of an extruded monolith with about 400 extruded channels per square inch of the inlet/outlet faces of the monolith As described above in this specification, it is preferred that the cold-start exhaust gas stream first flows into contact with the silver-based NOx adsorber material because the function of the silver-based adsorber material benefits from the presence of hydrogen in the cold-start exhaust gas stream. Accordingly, it is suitable that the washcoat of silver-based material is applied as a washcoat layer to channel wall surfaces of a first monolith and the zeolite-PGM washcoats applied to the channels of a second and downstream monolith. Or the silver-based adsorber may be applied to channel surfaces of the inlet portions of a single monolith that is upstream in exhaust gas flow with respect to zeolite-PGM based NOx adsorber material washcoat on the downstream portions of the same channels of the monolith. In another and preferred embodiment, the silver catalyst washcoat is applied over (on top of) a previously applied zeolite-PGM adsorbent catalyst washcoat layer.

This silver-based NOx adsorbent material ($Ag/Al_2O_3$) is effective in oxidation of nitric oxide (NO) to nitrogen dioxide ($NO_2$) and the storage of mixed nitrogen oxides (NOx) assisted by hydrogen ($H_2$) in exhaust gas streams in a temperature window of 75° C. to 200° C. (preferably, about 100° C. to about 190° C.). The silver-based NOx adsorber material has a NOx release temperature window of 280° C. to 350° C.

A second component of the adsorbent material catalyst (zone-coated at the rear/outlet of silver-based NOx adsorber or as a separate adsorber brick) combination utilizes a sub-combination of washcoat particles of a zeolite material and a supported platinum group metal. For example, the zeolite may be a natural or synthetic zeolite such as a beta zeolite. The beta zeolite is soaked with an aqueous solution of iron nitrate. Particles of silica are combined with the iron infiltrated zeolite particles. And the silica/iron infiltrated zeolite slurry is applied to the channel wall surfaces as a washcoat layer to achieve a washcoat loading of iron/zeolite of about 190 g/L of the outer volume of the monolith. The washcoated monolith is calcined by heating at 500° C. in air for 4 hours.

Palladium is added to the iron/zeolite wash coated channel wall surfaces of the cordierite monolith by impregnation of the washcoat layer with an aqueous palladium nitrate solution. A loading of palladium of about 100 g/ft$^3$ of the outer volume of the monolith is readily achieved. The palladium/iron zeolite washcoated monolith is dried and again calcined in air at 500° C. for four hours.

Platinum nitrate is then added to a water slurry of alumina particles (less than ten or so microns in diameter) to form a slurry of platinum/alumina material. The platinum/alumina slurry is then applied as a coextensive washcoat to the Pd—Fe-zeolite washcoated monolith. A loading of about 25 grams of platinum per cubic foot of outer surface area of the monolith may be achieved. The washcoated monolith (now 4 times washcoated in this example) is again dried and calcined at 500° C. for four hours. The atomic ratio of platinum to palladium in the zeolite-PGM NOx adsorber material is suitably in the range of 1:8 to 1:1 and preferably at about an atomic ratio of 1:4.

A zeolite-PGM NOx adsorber material (the second component) usually has high NOx storage efficiency from room temperature, but begins releasing NOx below 150° C.

The washcoated monolith(s) with a combination of the silver and zeolite-PGM, NOx adsorber materials is contained in a suitable high temperature resistant metal housing(s), and placed with the inlet close to the exhaust manifold(s) of a lean-burn engine powered vehicle (e.g., with the inlet within about five centimeters to about one meter of the exhaust manifold outlet), serve to adsorb and hold and store NOx, and store and oxidize CO, and HCs from a cold start exhaust stream, until the combination of NOx adsorbent materials has been heated to about 200° C. While the exhaust constituents are adsorbed on this combination of adsorbent materials, some oxidation of NO to $NO_2$ occurs, as does some oxidation of CO and HCs. When the adsorbent combination has been heated to its release temperature range (>280° C.), the adsorbed NOx components are released back into the exhaust stream in which they are carried to a downstream catalytic converter and being reduced to nitrogen and water before emitted out of the tailpipe.

Figure 1:
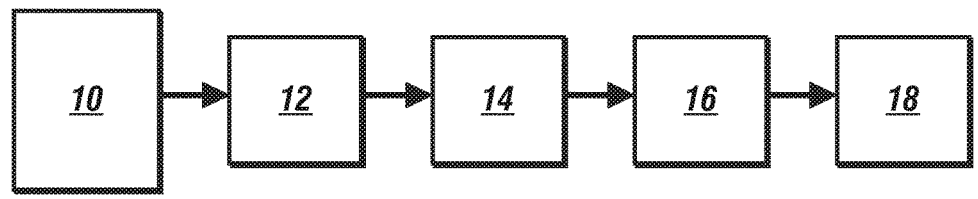
FIG. 1 is a schematic diagram illustrating one example of the flow of a NOx-containing diesel exhaust stream (dark line with arrow head) leaving an exhaust gas manifold of a diesel engine (process flow box 10). In this embodiment of the invention, the cold-start hydrogen-containing exhaust gas flows first through the channels of monolithic NOx adsorption body (box 12), the channels being coated with a washcoat layer of a silver NOx adsorbent material overlying a previously applied washcoat layer of a zeolite-PGM adsorber layer. The thus layered washcoat layers may also provide hydrocarbon and CO storage and some oxidation of these exhaust constituents. After the exhaust gas leaves the channels of the monolithic NOx adsorption body, and under suitable exhaust gas conditions, a reductant material for the reduction of NOx constituents may be added to the exhaust gas (box 14). The diesel exhaust stream then flows through a selective catalytic reduction converter (SCR) for the reduction of NOx to nitrogen and water (box 16), and a particulate filter (box 18), before leaving the vehicle's exhaust tailpipe. If needed, the SCR and particulate filter may be combined into a single SCR filter converter. For example, one or more NOx absorbers may be followed in the exhaust stream flow by a selective catalytic reduction system on a particulate filter device or on a lean NOx trap device. But the cold-start exhaust stream encounters the silver NOx adsorbent material and downstream zeolite PGM material before it enters another device for modification of the exhaust stream constituents.

As illustrated in the schematic exhaust flow diagram of FIG. 1, the exhaust from a diesel engine, following a cold-start, (Box 10) comprises nitric oxide (NO), a small amount of $NO_2$, carbon monoxide, residual fuel hydrocarbons (HCs), up to 500 ppm hydrogen, carbon dioxide, water, and nitrogen. The task of the NOx adsorber materials, with a combination of silver-based NOx adsorber ($Ag/Al_2O_3$) and zeolite-PGM adsorber of NOx (Box 12) is to adsorb NOx, store and oxidize CO and HCs from a cold start exhaust stream from a diesel engine or other lean-burn engine. As illustrated in FIG. 1, the continual flow of the warming exhaust gas carries it, in succession, in the closed, flow-through exhaust system, from the NOx adsorber monolith(s) (Box 12) to a selective catalytic reduction converter (Box 16), and a filter for particulates (Box 18). In some embodiments of the invention a reductant for NOx such as an aqueous solution of urea or ammonia may be injected to the exhaust at a location upstream of the SCR converter (Box 14). And particulate material is removed from the exhaust stream in the particulate filter (Box 18) before the exhaust is discharged from the tailpipe of the vehicle. This is an example of one sequence of exhaust treatment devices downstream in the exhaust flow from the subject combination of silver-based and zeolite PGM NOx adsorbers.

Figure 2:
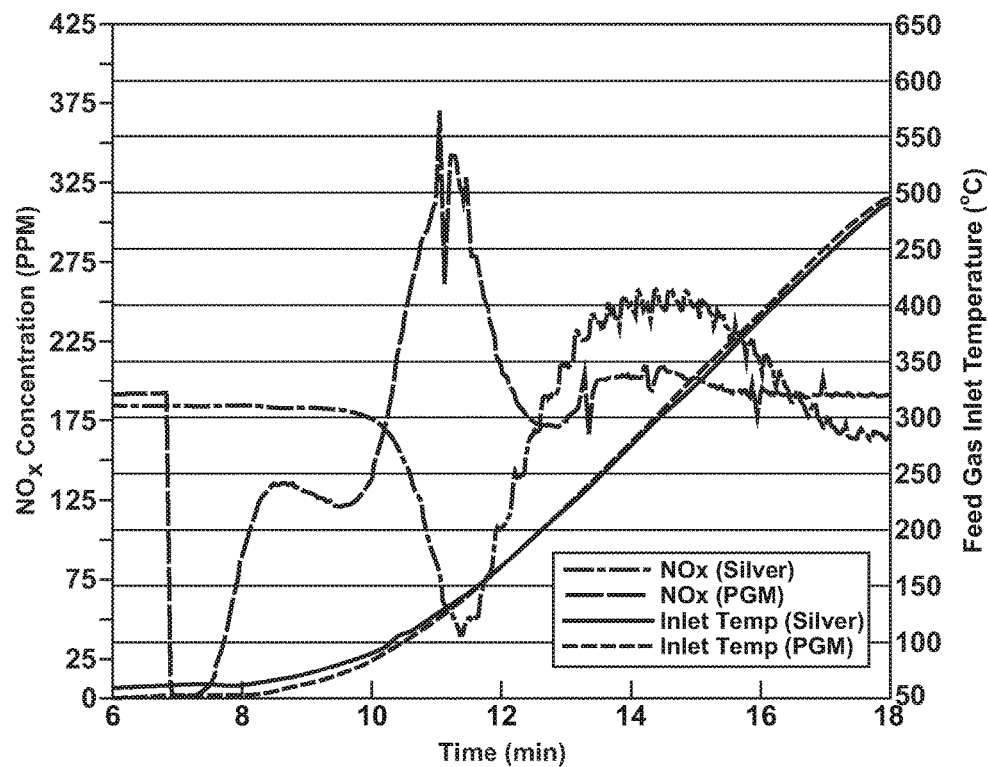
FIG. 2 presents data in the form of graphs of the NOx adsorption of a zeolite-PGM adsorber (long dash line) with low temperature NOx storage, and the NOx adsorption of a silver-based NOx adsorber with higher temperature, $H_2$-assisted, NOx storage (dash-dot line). The NOx adsorptions of the two NOx adsorbers were evaluated separately as wash coat layers on the channel walls of a cordierite monolith (400 channels/in$^2$). A synthetic exhaust gas mixture of, by volume, 1000 ppm HC (C1, a mixture of one-part propane and 2.5 parts propylene), 400 ppm CO, 10% oxygen, 6% $CO_2$, 2.5% $H_2O$ and 185 ppm NO was passed over each adsorption catalyst at a space velocity (SV) of 40,000 hr$^{-1}$. The gas mixture passed over the silver catalyst also contained 500 ppm $H_2$.

FIG. 2 presents data in the form of graphs of the NOx adsorption of a zeolite-PGM catalyst (long dash line, labeled PGM) with low temperature NOx storage and the adsorption of a silver-based NOx adsorber with higher temperature, $H_2$-assisted, NOx storage (dash-dot line). A silver-alumina adsorber was prepared by depositing nanometer-size particles of silver from an aqueous silver nitrate solution onto micrometer-size particles of a commercial high surface area alumina (e.g., 200 m$^2$/g). The deposition was performed such that the silver content of the Ag/alumina particles was five percent by weight of the total of the silver and alumina. The Ag/alumina particles were dispersed in a volume of water and applied as a washcoat on the channel wall surfaces of a small sectioned flow through cordierite monolith (400 channels/in$^2$ of inlet face of the monolith). After the washcoat was applied, the silver-silver oxide washcoated cordierite monolith was calcined in water-containing air at 500° C. for six hours. About 170 grams of silver/alumina particles was applied per liter of the outside volume of the cordierite monolith.

A commercial particulate zeolite-PGM adsorbent for NOx was obtained and designated as (PGM). It was applied as a washcoat to the channel walls of a separate cordierite monolith of substantially the same channel structure and outer superficial volume. The applied washcoat (applied to the channels) of the commercial zeolite-PGM adsorbent had a PGM loading of about 125 grams per cubic foot of outer volume of its cordierite monolith. The atomic ratio of platinum to palladium in the washcoat was about 1:4.

The NOx adsorptions of the two NOx adsorption material components were evaluated separately as wash coat layers on the channel walls of their respective cordierite monolith supports. A synthetic exhaust gas mixture of, by volume, 1000 ppm HC (based on $C_1$ content, actually a mixture of one-part propane and 2.5 parts propylene), 400 ppm CO, 10% oxygen, 6% $CO_2$, 2.5% $H_2O$ and 185 ppm NO was passed over each adsorption catalyst at a space velocity (SV) of 40,000 hr$^{-1}$. The gas mixture passed over the silver-based NOx adsorber also contained 500 ppm $H_2$. The synthetic exhaust gas stream was heated from ambient temperature to fully warmed-up exhaust gas temperatures—from about 50° C. to about 500° C. over a period of about 18 minutes. While each adsorbent catalyst sample was capable of temporarily storing (and oxidizing) each of NOx, CO, and hydrocarbons, our principal concern was with obtaining significant adsorption of NO and other NOx constituents following a cold start. Accordingly, the NOx content of the progressively warming exhaust gas leaving the respective washcoated monolith supports was measured by Fourier transform infrared spectroscopy.

The left vertical axis of the graph presents the NOx concentration (ppm) leaving each catalyzed monolith. As stated in the above paragraph, the initial amount of NO in each exhaust stream was 185 ppm. Each introduced synthetic exhaust gas stream was heated from about 50° C. to about 500° C. (right vertical axis) over a period of about 18 minutes (horizontal axis). The progressively increasing inlet temperature of the silver-based NOx adsorber is indicated by the solid line and that of the zeolite-PGM adsorber by the short dash line.

It is seen that the NOx adsorption of the zeolite-PGM adsorber material is best at lower exhaust stream temperatures and that of the silver-based NOx adsorber material is best at higher temperatures relative to the adsorbed NOx that is being removed from the zeolite-PGM adsorber.

FIG. 3 presents a series of bar graphs comparing NOx storage efficiencies obtained by a silver-based NOx adsorbent, a zeolite-PGM based NOx adsorbent, and a combination of the silver-based adsorbent and the zeolite-PGM adsorber material from cold start exhaust streams produced by a 1.6 L diesel engine operated at three different semi-transient engine operating conditions.

The tests were conducted with the absorber materials applied as wash coats to monoliths of like channel configurations but having different outer, superficial volumes. A silver-based absorber (Ag/alumina, 5 weight % silver based on the silver plus alumina) was deposited as a washcoat on a monolith having an outer volume of 0.5 liter. A commercial zeolite-platinum absorber was deposited as a washcoat on a monolith with an outer, superficial volume of 1.6 liters. And the same catalysts were deposited on separate monoliths of outer volumes of 0.5 liter (Silver, the upstream monolith) and 1.1 liters for the zeolite-PGM absorber material, the downstream monolith. These two monoliths were used in combination to adsorb NOx during the third series of cold-start engine tests.

At each semi-transient engine operating condition, the test started from the cold-start, and then gradually approached the given speed/torque set point. During the course of a semi-transient test, all emission components and temperature traces at both upstream and downstream of a given NOx adsorber converter were recorded. Up on the completion of the given semi-transient test, the exhaust temperature was brought to over 550° C. for 30 min to fully clean up the given catalyst. A fast cool-down procedure was applied to bring the temperatures of the engine system down to that of the cold-start condition before starting another semi-transient test. The NOx storage efficiency (%) was calculated based on the area integration method by comparing the NOx emission traces before and after a given NOx adsorbent catalyst.

The data from the respective tests is presented in the bar graphs of FIG. 3. It is seen, that in each of the three-modes of diesel engine startup operation, the silver-based NOx absorber material, alone, displayed high NOx storage efficiency values in terms of percentage of the total NOx content of the engine exhaust. And the zeolite-PGM material, alone, also displayed good values of NOx storage efficiency (%). But the combination of the same two NOx absorber materials (with a smaller volume of zeolite-PGM material) did significantly better than the individual NOx absorber components in each mode of diesel engine operation following a cold start of the engine.

An illustration of a suitable washcoated monolithic NOx adsorber 50 for containing a silver-based NOx adsorber material ($Ag/Al_2O_3$) and a zeolite-PGM adsorber material combination in the exhaust stream of a diesel engine is presented in FIG. 4. The NOx adsorber converter 50 may comprise a round tubular stainless steel body 52 for tightly enclosing a round cylindrical catalyzed cordierite monolith 54 which is seen in two broken out windows in the side of body 52. The washcoated monolith 54, for the combined NOx adsorbent material washcoat(s), may be formed of other known and suitable high temperature resistant metal or ceramic material. In this embodiment, the washcoated cordierite monolith 54 is formed with many exhaust gas flow-through channels that extend from an upstream exhaust gas inlet face 56 of the adsorbent material washcoated monolith 54 through the length of the body to a downstream exhaust gas outlet face (not visible in FIG. 4) of the monolith 54. For example, 400 flow-through channels per square inch of inlet face are typically formed during extrusion of the ceramic body. The walls of these small flow-through channels are represented as crossing lines in the illustration of the exhaust gas flow inlet face 56.

The monolith 54 contains a predetermined combination of a silver-based NOx adsorber material ($Ag/Al_2O_3$) and zeolite-PGM, NOx adsorber material in the form of a zone-coated single monolith, or two separate monoliths, or a dual-layer washcoat design as described previously. The diameter of steel body 52 is enlarged with respect to the upstream and downstream exhaust conduits so as to reduce drag on the exhaust stream. The adsorber coated monolith 54 is sealed within steel body 52 so that exhaust gas flow is directed into contact with the NOx adsorbent washcoats on the channel wall surfaces of the catalyzed monolith 54. The monolith is sized with sufficient channel wall surface area to carry sufficient wash coat material to provide sufficient combined adsorbent step-wise contact with a flowing cold-start exhaust gas during its residence time in the absorber monolith 50.

As seen in FIG. 4, the upstream end of steel enclosure body 52 (as indicated by exhaust flow direction arrow 58 is enclosed by an expanding stainless steel exhaust inlet section 60. Exhaust inlet 62 of exhaust inlet section 60 is sized and adapted to receive exhaust flow from an exhaust conduit (not shown in FIG. 4) close-coupled to the exhaust manifold of a diesel engine or other lean burn engine. In a like manner, the downstream end (exhaust flow arrow 64) of the steel enclosure body 52 is enclosed by a converging exhaust outlet section 66 with an exhaust gas outlet 68. Outlet 68 is adapted to be welded or otherwise connected to an exhaust conduit to conduct the exhaust gas to a further downstream catalytic converter such as an SCR converter.

Thus, we have described how a combination of a silver-based NOx adsorption material and a zeolite-PGM adsorption material for NOx greatly improves the temporary storage of NOx (and CO and HCs) from the exhaust stream flowing from a diesel engine or a lean burn gasoline engine following a cold-start of the engine.

The invention claimed is:

1. A method of treating the exhaust gas stream flowing from the exhaust manifold of a diesel engine or a lean-burn gasoline engine during a period following a cold-start of the engine, the exhaust gas stream comprising a mixture of nitrogen oxides, carbon monoxide, residual hydrocarbons, hydrogen, carbon dioxide, water, and nitrogen, the exhaust gas stream being at an initial temperature at or below about 25° C. to 35° C. and progressively warming during further engine operation, the method comprising;

continually passing the nitrogen oxides-containing exhaust gas stream as it leaves the exhaust manifold of the engine into contact with channel wall surfaces of a washcoated monolith comprising a combination of a silver-based (Ag/Al2O3) NOx adsorber washcoat layer and a distinct zeolite-platinum group metal (zeolite-PGM) NOx adsorber washcoat layer to adsorb and store nitrogen oxides (NOx) from the cold exhaust gas until the exhaust gas reaches a temperature of about 200° C., the distinct zeolite-PGM NOx adsorber washcoat layer being located downstream of the silver-based (Ag/Al2O3) NOx adsorber washcoat layer with respect to the direction of flow of the exhaust gas stream such that the hydrogen-containing exhaust gas flows over the silver-based NOx adsorber washcoat layer before it flows over the zeolite-PGM NOx adsorber washcoat layer; and then continually passing the exhaust gas stream into contact with at least one downstream selective catalytic reduction converter (SCR) for further reduction of nitric oxide and nitrogen dioxide as the exhaust gas increases in temperature and heats the at least one downstream selective catalytic reduction converter (SCR) to an operating temperature; and continuing the passage of the exhaust gas during the duration of engine operation, while NOx stored is removed from the combination of the silver/alumina NOx adsorber washcoat layer and the zeolite-PGM NOx adsorber washcoat layer when the exhaust gas reaches a temperature of about 200° C. during lean-burn engine operation and the combination of the NOx adsorber layers ceases its affect on the warmed exhaust gas stream until the engine is stopped and started again, following an engine cool-down period.

2. The method of treating the exhaust gas stream flowing from a diesel engine or a lean-burn gasoline engine during a period following a cold-start of the engine as stated in claim 1 in which carbon monoxide and hydrocarbons are also stored and oxidized on the washcoated NOx adsorbent material.

3. The method of treating the exhaust gas stream flowing from a diesel engine or a lean-burn gasoline engine during a period following a cold-start of the engine as stated in claim 1 in which the silver/alumina adsorption material is deposited as a washcoat solely on channel wall surfaces of a first flow-through monolith support that directly receives the exhaust stream from the engine and the zeolite-PGM adsorbent material is deposited solely as a washcoat on channel wall surfaces of a separate flow-through monolith support that is directly downstream of the first flow-through monolith in the flow path of the exhaust stream.

4. The method of treating the exhaust gas stream flowing from a diesel engine or a lean-burn gasoline engine during a period following a cold-start of the engine as stated in claim 1 in which the silver/alumina adsorption material is deposited as a washcoat on channel wall surfaces at the inlet end of the flow-through monolith support that directly receives the exhaust stream from the engine and the zeolite-PGM adsorbent material is deposited as a washcoat on channel wall surfaces at the outlet end of the same flow-through monolith.

5. The method of treating the exhaust gas stream flowing from a diesel engine or a lean-burn gasoline engine during a period following a cold-start of the engine as stated in claim 1 in which the zeolite-PGM adsorbent material is deposited as a washcoat directly on channel wall surfaces of the flow-through monolith support that directly receives the exhaust stream from the engine, and the silver/alumina adsorbent material is deposited as a distinct washcoat layer overlying the zeolite-PGM washcoat and co-extensive with the underlying zeolite-PGM washcoat.

6. The method of treating the exhaust gas stream flowing from a diesel engine or a lean-burn gasoline engine during a period following a cold-start of the engine as stated in claim 1 in which the composition of the silver/alumina washcoat consists of particles of silver or a silver oxide deposited on particles of alumina and the silver content is 0.5 to fifteen weight percent of the total of the silver and alumina.

7. The method of treating the exhaust gas stream flowing from a diesel engine or a lean-burn gasoline engine during a period following a cold-start of the engine as stated in claim 1 in which the silver/alumina washcoat and the zeolite-PGM washcoat are applied to a single monolith, or to separate monoliths, and the weight of the applied silver/alumina washcoat is ten to fifty percent of the total weight of the silver/alumina washcoat and the zeolite/PGM wash coat.

8. The method of treating the exhaust gas stream flowing from a diesel engine or a lean-burn gasoline engine during a period following a cold-start of the engine as stated in claim 7 in which the respective proportions of the silver/alumina washcoat and the zeolite/PGM washcoat are based on the total outside volume of the monolith, or the portions of the length of the monolith, that enclose the portions of the monolith channel passages that carry the silver/alumina washcoat and the zeolite/PGM washcoat.

9. The method of treating the exhaust gas stream flowing from a diesel engine or a lean-burn gasoline engine during a period following a cold-start of the engine as stated in claim 1 in which the zeolite-PGM NOx adsorber washcoat layer comprises a mixture of iron-infiltrated zeolite particles, silica particles, palladium particles, and particles of platinum carried on alumina support particles.

10. The method of treating the exhaust gas stream flowing from a diesel engine or a lean-burn gasoline engine during a period following a cold-start of the engine as stated in claim 1 in which the zeolite-PGM NOx adsorber washcoat comprises platinum and palladium in an atomic ratio range of 1:1 to 1:8.

11. The method of treating the exhaust gas stream flowing from a diesel engine or a lean-burn gasoline engine during a period following a cold-start of the engine as stated in claim 1 in which the flow path of the cold-start exhaust stream is such that the cold-start exhaust stream contacts the silver-based (Ag/Al2O3) washcoat layer within one meter from its exit from the exhaust manifold of the engine.

12. A method of treating the exhaust gas stream flowing from the exhaust manifold of a diesel engine or a lean-burn gasoline engine during a period following a cold-start of the engine, the exhaust gas stream comprising a mixture of nitrogen oxides, carbon monoxide, residual hydrocarbons, hydrogen, carbon dioxide, water, and nitrogen, the exhaust gas stream being at an initial temperature at or below about 25° C. to 35° C. and progressively warming during further engine operation, the method comprising;
   continually passing the nitrogen oxides-containing exhaust gas stream as it leaves the exhaust manifold of the engine into contact with channel wall surfaces of a washcoated monolith comprising a combination of a silver-based (Ag/Al2O3) NOx adsorber washcoat layer and a distinct zeolite-platinum group metal (zeolite-PGM) NOx adsorber washcoat layer to adsorb and store nitrogen oxides (NOx) from the cold exhaust gas until the exhaust gas reaches a temperature of about 200° C., the zeolite-PGM NOx adsorber washcoat layer being deposited directly on channel wall surfaces of the flow-through monolith support that directly receives the exhaust stream from the engine, and the silver/alumina NOx adsorber washcoat layer is deposited overlying the zeolite-PGM washcoat layer and co-extensive with the underlying zeolite-PGM NOx adsorber washcoat layer, such that the hydrogen-containing exhaust gas flows over the silver-based NOx adsorber washcoat layer before it flows over the zeolite-PGM NOx adsorber washcoat layer; and then continually
   passing the exhaust gas stream into contact with at least one downstream selective catalytic reduction converter (SCR) catalytic for further reduction of nitric oxide and nitrogen dioxide as the exhaust gas increases in temperature and heats the at least one downstream selective catalytic reduction converter (SCR) to an operating temperature; and
   continuing the passage of the exhaust gas during the duration of engine operation, while NOx stored is removed from the combination of the silver/alumina NOx adsorber washcoat layer and the zeolite NOx adsorber washcoat layer when the exhaust gas reaches a temperature of about 200° C. during lean-burn engine operation and the combination of the NOx adsorber washcoat layers ceases its affect on the warmed exhaust gas stream until the engine is stopped and started again, following an engine cool-down period.

13. The method of treating the exhaust gas stream flowing from a diesel engine or a lean-burn gasoline engine during a period following a cold-start of the engine as stated in claim 12 in which the weight of the applied silver/alumina washcoat is ten to fifty percent of the total weight of the silver/alumina washcoat and the zeolite/PGM wash coat.

14. The method of treating the exhaust gas stream flowing from a diesel engine or a lean-burn gasoline engine during a period following a cold-start of the engine as stated in claim 12 in which the composition of the silver/alumina washcoat consists of particles of silver or a silver oxide deposited on particles of alumina and the silver content is 0.5 to fifteen weight percent of the total of the silver and alumina.

15. The method of treating the exhaust gas stream flowing from a diesel engine or a lean-burn gasoline engine during a period following a cold-start of the engine as stated in claim 12 in which the zeolite-PGM NOx adsorber washcoat layer comprises a mixture of iron-infiltrated zeolite particles, silica particles, palladium particles, and particles of platinum carried on alumina support particles.

16. The method of treating the exhaust gas stream flowing from a diesel engine or a lean-burn gasoline engine during a period following a cold-start of the engine as stated in claim 12 in which the zeolite-PGM NOx adsorber washcoat comprises platinum and palladium in an atomic ratio range of 1:1 to 1:8.

17. The method of treating the exhaust gas stream flowing from a diesel engine or a lean-burn gasoline engine during a period following a cold-start of the engine as stated in claim 12 in which the flow path of the cold-start exhaust stream is such that the cold-start exhaust stream contacts the silver-based ($Ag/Al_2O_3$) washcoat layer within one meter from its exit from the exhaust manifold of the engine.

* * * * *